US006873234B2

(12) United States Patent
Kyouno et al.

(10) Patent No.: US 6,873,234 B2
(45) Date of Patent: Mar. 29, 2005

(54) ELECTROMAGNETIC ACTUATOR MOUNTING STRUCTURE

(76) Inventors: Tsuneo Kyouno, c/o Namiki Precision Jewel Co., Ltd., 8-22 Shinden 3-Chome, Adachi-ku, Tokyo (JP), 123-8511; Teruo Yoshinari, c/o Namiki Precision Jewel Co., Ltd., 8-22 Shinden 3-Chome, Adachi-ku, Tokyo (JP), 123-8511; Minoru Ueda, c/o Namiki Precision Jewel Co., Ltd., 8-22 Shinden 3-Chome, Adachi-ku, Tokyo (JP), 123-8511

( * ) Notice: Subject to any disclaimer, the term of this patent is extended or adjusted under 35 U.S.C. 154(b) by 0 days.

(21) Appl. No.: 09/947,406

(22) Filed: Sep. 7, 2001

(65) Prior Publication Data

US 2002/0008602 A1 Jan. 24, 2002

Related U.S. Application Data

(62) Division of application No. 09/601,319, filed as application No. PCT/JP98/01673 on Oct. 23, 2000.

(30) Foreign Application Priority Data

Feb. 6, 1998 (JP) ............................................ 10-41183
Mar. 13, 1998 (JP) ............................................ 10-82489

(51) Int. Cl.[7] .............................. G08B 3/00; H04B 3/36

(52) U.S. Cl. .................... 335/278; 335/222; 340/407.1; 340/388.1; 340/388.3; 340/391.1

(58) Field of Search ................................ 335/222–223, 335/257, 271, 277, 278; 381/386–433; 340/407.1, 388.1–391.1

(56) References Cited

U.S. PATENT DOCUMENTS 4,087,770 A * 5/1978 Kuhn et al. ................. 335/132
5,528,697 A * 6/1996 Saito ....................... 340/407.1
5,894,263 A * 4/1999 Shimakawa et al. ..... 340/384.1
6,208,237 B1 * 3/2001 Saiki et al. .............. 340/388.1

FOREIGN PATENT DOCUMENTS

| | | |
|---|---|---|
| JP | 01-171191 | 12/1989 |
| JP | 09-261917 | 10/1997 |
| JP | 09-275671 | 10/1997 |
| JP | 10-117472 | 5/1998 |

OTHER PUBLICATIONS

International Search Report dated Jul. 21, 1998.

* cited by examiner

*Primary Examiner*—Ramon M. Barrera
(74) *Attorney, Agent, or Firm*—Eric J. Robinson; Robinson Intellectual Property Law Office, P.C.

(57) ABSTRACT

An improved electromagnetic actuator having a coil (10) on which a current is impressed, a magnet (20) that forms a magnetic circuit across a magnetic gap (G) with a magnet yoke (21), and having a diaphragm (11) that vibrates when a high-frequency current is impressed, and a vibration plate (22) that vibrates when a low-frequency current is impressed, with these parts enclosed within a basket (3) and the coil (10) placed within the magnetic gap (G). As one invention, a radial array of magnets, a vibration plate with a double-suspension structure, and a bottom plate of magnetic shielding material are placed in the basket to suppress the leakage of magnetic flux. As an invention to further improve the frequency characteristics by means of the mounting structure of the electromagnetic actuator, elastic packing (5, 7) is sandwiched between the basket of the electromagnetic actuator and the housing case of the portable electronic equipment, and also between the basket of the electromagnetic actuator and the mounting.

19 Claims, 7 Drawing Sheets

ELECTROMAGNETIC ACTUATOR MOUNTING STRUCTURE

FIELD OF TECHNOLOGY TO WHICH INVENTION BELONGS

This invention concerns an electromagnetic actuator and a structure for mounting it in portable electronic equipment such as a pager or portable telephone, as a means of notification of a call by means of a buzzer, audio tone or vibration when a signal is received.

BACKGROUND OF INVENTION

Pagers and portable telephones are made with built-in notification devices, which have vibrators as well as buzzers, as a means of call notification in conferences and other locations where it is inappropriate to use an audible alarm. If the vibration mode is switched on in advance, the vibrator is driven instead of an alarm being sounded when a call comes in, and the recipient is made aware of the call by means of the vibration.

In the past, this vibration has been created by a small motor, an eccentric weight attached to the shaft of the motor such that a vibration it generated when the battery-driven motor is caused to rotate.

As portable electronic equipment including pagers and portable telephones has become smaller and lighter, further miniaturization of motors has become necessary, but there are limits to the miniaturization of call notification devices with both vibrators and buzzers. Moreover, because the amount of vibration from battery drive is fixed, there is a further drawback in that there are individual differences in the strength of vibration necessary.

To resolve this problem, the applicants have developed a speaker-type electromagnetic actuator that does not use the small motor of U.S. Pat. No. 5,528,697.

This electromagnetic actuator is an epochal product that combines the function of selecting the vibration ring, buzzer ring or tone ring as a vibration mode into the same unit as the speaker function. It is so constituted that when a given frequency is impressed on a coil, the interaction of the magnetic field of the magnets and the current impressed on the coil generates vibration in a vibration plate in the case of a low frequency or a resonant tone in a diaphragm in the case of a high frequency. Moreover, because it is possible to control the amount of vibration and the frequency, the amount of vibration can be adjusted and set at the level desired by the individual.

As portable telephone equipment has become widely used, there has been demand for an electromagnetic actuator that can suppress the external leakage of magnetic flux and also have good frequency characteristics even though small in size. There has also been demand for high durability within the usage environment of portable electronic equipment with internal electromagnetic actuators, such that they do not break even if the user drops them. There is further demand, from the perspective of cost reduction, for reduction of the number of parts and for ease of assembly.

OVERVIEW OF INVENTION

This invention is an improved electromagnetic actuator with a small and simple structure, having a coil on which current is impressed, a magnet that forms a magnetic circuit between its poles across a magnetic gap with a magnet yoke, and having a diaphragm that vibrates when a high-frequency current is impressed, and a vibration plate that vibrates when a low-frequency current is impressed, with the coil placed within the magnetic gap and the parts enclosed within a basket. The structure for mounting the electromagnetic actuator is also improved.

One purpose of this invention is to suppress the external leakage of magnetic flux. To achieve this purpose, this invention can be constituted with a radial array of magnets, a vibration plate with a double-suspension structure, and a bottom plate of magnetic shielding material placed in the basket.

Another purpose of this invention is to constitute the electromagnetic actuator with good frequency characteristics even when it is small. To achieve that purpose, this invention selects the material of the vibration plate and also uses the basket as a third vibrator, in addition to the diaphragm and the vibration plate.

A further purpose of this invention is to constitute an electromagnetic actuator with high impact resistance. To achieve this purpose, the invention is constituted with a elastic material that retains and supports the vibration plate within the basket.

This invention also has the purpose of cost-reduction, and is constituted with a diaphragm that holds the coil in a raised portion, and a vibration plate that holds both the magnets and the magnet yoke on its surface.

In addition, this invention has the purpose of further improving frequency characteristics and impact resistance by means of the mounting structure for the electromagnetic actuator. Thus this invention is constituted with elastic packing sandwiched between the basket of the electromagnetic actuator and the housing case of the portable electronic equipment, and also between the basket of the electromagnetic actuator and the mounting structure.

DETAILED EXPLANATION

Figure 1:
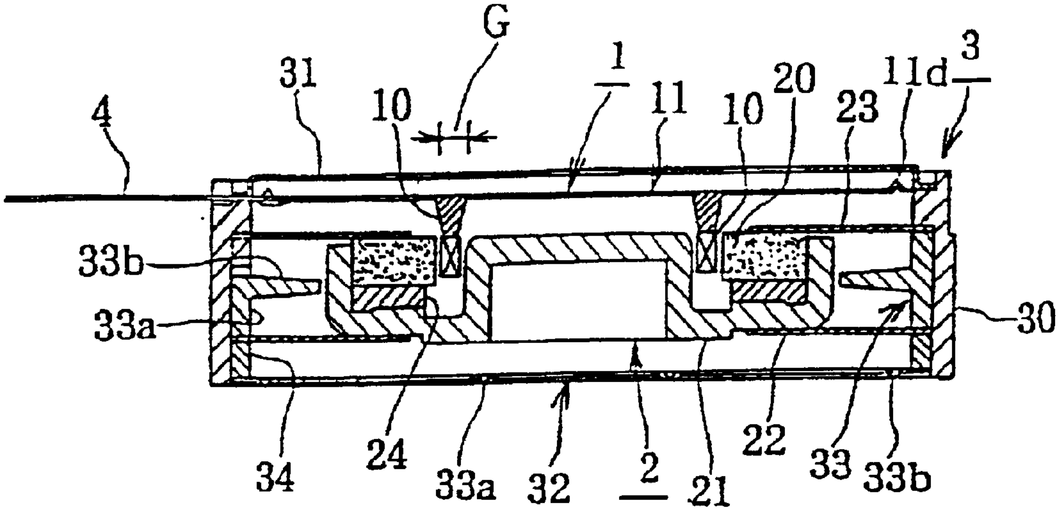
FIG. 1 is a cross section showing the assembly structure of the electromagnetic actuator of this invention.

To explain this invention in detail with reference to the drawings, the electromagnetic actuator of this invention is constituted, as shown in FIG. 1, with a first vibrator 1 that produces a resonant tone when a high frequency current is impressed, a second vibrator 2 that produces a vibration when a low frequency current is impressed, and a basket 3 that contains the first and second vibrators 1, 2 as the minimum necessary assembly parts.

Figure 2:
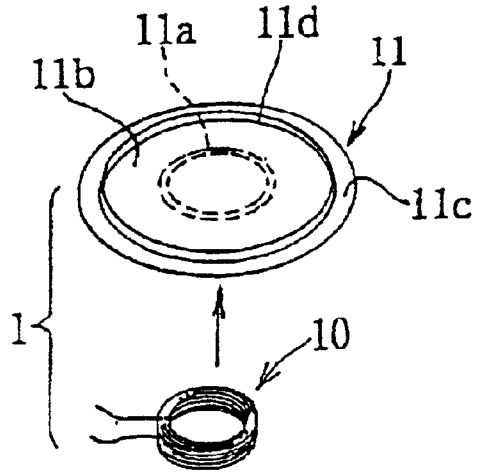
FIG. 2 is an exploded oblique drawing of the first vibrator, which is a structural part of the electromagnetic actuator of this invention.

The first vibrator 1 comprises, as shown in FIG. 2, a voice coil (hereafter simply "coil") 10 that is wound in a circular shape and on which either a high frequency or low frequency current can be impressed, and a thin diaphragm 11 that holds the coil 10 in place.

The diaphragm 11 is formed from a thin disk of a polymer material such as polyether imide (PEI). This diaphragm 11 has a concentric circular projection 11*a* that projects to a given height from the surface to hold the coil 10 in place. The surface of the diaphragm 11 also has a concentric circular lip 11*d* near the outer edge that divides the vibrating portion 11*b* from the outer rim 11*c* that is necessary for assembly with the basket 3. The coil 10 is fixed to the projection 11*a* on the surface of the diaphragm 11, and is thus held in place by the diaphragm 11.

Because of the structure of the first vibrator 1, no other support member is needed to hold the coil 10 in place, and so it is possible to reduce the number of parts and also to mount the coil 10 easily. Moreover, because the coil 10 is fixed to the projection 11*a* that projects from the surface of the vibrating portion 11*a,* it is possible for this vibrating portion 11*b* to maintain good frequency characteristics, unaffected by having the coil 10 mounted.

Figure 3:
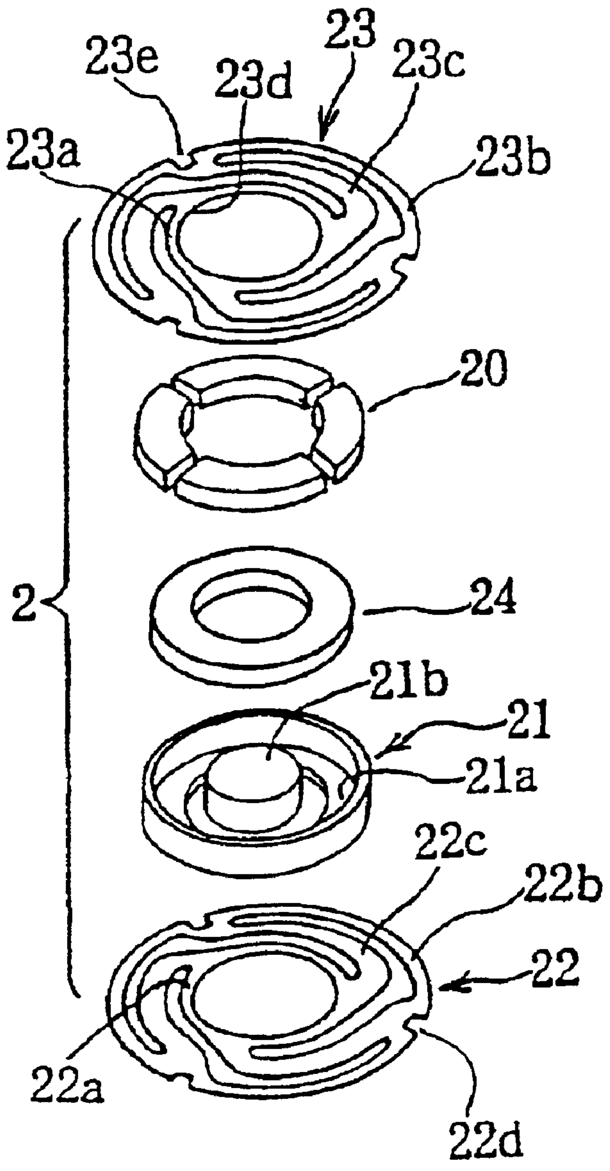
FIG. 3 is an exploded oblique drawing of the second vibrator, which is a structural part of the electromagnetic actuator of this invention.

The second vibrator 2 comprises, as shown in FIG. 3, a magnet 20 that forms a magnetic circuit, a magnet yoke 21 that holds the magnet 20 in place, and a thin vibrator plate 22 that holds the magnet yoke 21 in place.

The magnet 20 is shaped for a radial array. The magnet 20 of this radial array forms a ring with its north and south poles on the inner and outer peripheries to produce a magnetic circuit radiating between poles. The magnet 20 is held within the magnet yoke 21 and forms a unit with the magnet yoke 21 such that the north and south poles are positioned parallel to the first vibrator 1 and second vibrator 2. The magnet 20 is divided into four or some other number of pieces to facilitate placement in the magnet yoke 21.

The magnet yoke 21 is saucer shaped, with an outer rim 21*a,* and a raised pole piece 21*b* in the center. This pole piece 21*b* is a raised portio with a diameter smaller than the inner periphery of the magnet 20, so as to interpose a magnetic gap G (see FIG. 1) in the inner periphery of the magnet 20.

The vibration plate 22 is punched from a sheet of springy metal, and has s springy structure with a center plate 22*a* that is fixed to the magnet yoke 21, an outer rim 22*b* that can be fixed to the basket 3, and multiple curved arms 22*c* that connect the center plate and the outer rim.

Because the second vibrator 2 has the radially arrayed magnet 20, it is possible to suppress the leakage of magnetic flux in the direction of vibration of the diaphragm 11 and vibration plate 22 that vibrate through the attraction and repulsion by the magnetic force of the magnet 20 and the magnetic force generated by the coil 10. As with the constitution of the first vibrator 1, there is no need for a separate support member to support the magnet yoke 21, and so it is possible to reduce the number of parts and to assemble the magnet 20 and the magnet yoke 21 easily.

Now, to assure space for the coil 10 to enter to the back of the magnetic gap G in the magnet yoke 21, the yoke is assembled with a spacer 24 between it and the magnet 20.

The second vibrator 2 has, in addition to the vibration plate 22 described above, another vibration plate 23 with a center plate 23*a,* an outer rim 23*b* that can be fixed to the basket 3, and multiple curved arms 23*c* that connect the center plate and the outer rim. The center hole 23*d* of the vibration plate 23 has a diameter larger than the outer periphery of the coil 11 so that the coil 10 can be placed within the magnetic gap G.

Because the second vibrator 2 has two vibration plates 23 that form a double-suspension structure, the magnetic shielding is further enhanced and it is possible to suppress the leakage of magnetic flux even more effectively. And because it improves the vibration resistance, it is possible to maintain the initial vibration characteristics.

The vibration plates 22, 23 can be made of any stainless steel or alloy of copper and titanium that does not require an aging/hardening process after being punched. In order to improve the hardness/Young's modulus of the spring parts of vibration plates of these materials, it is possible to increase the resonant frequency to produce a large amount of vibration. Now, multiple notches 22*d*, 23*e* are made at regular intervals in the outer rims 22*b*, s2*b* in order to fix these vibration plates 22, 23 inside the basket 3.

Figure 4:
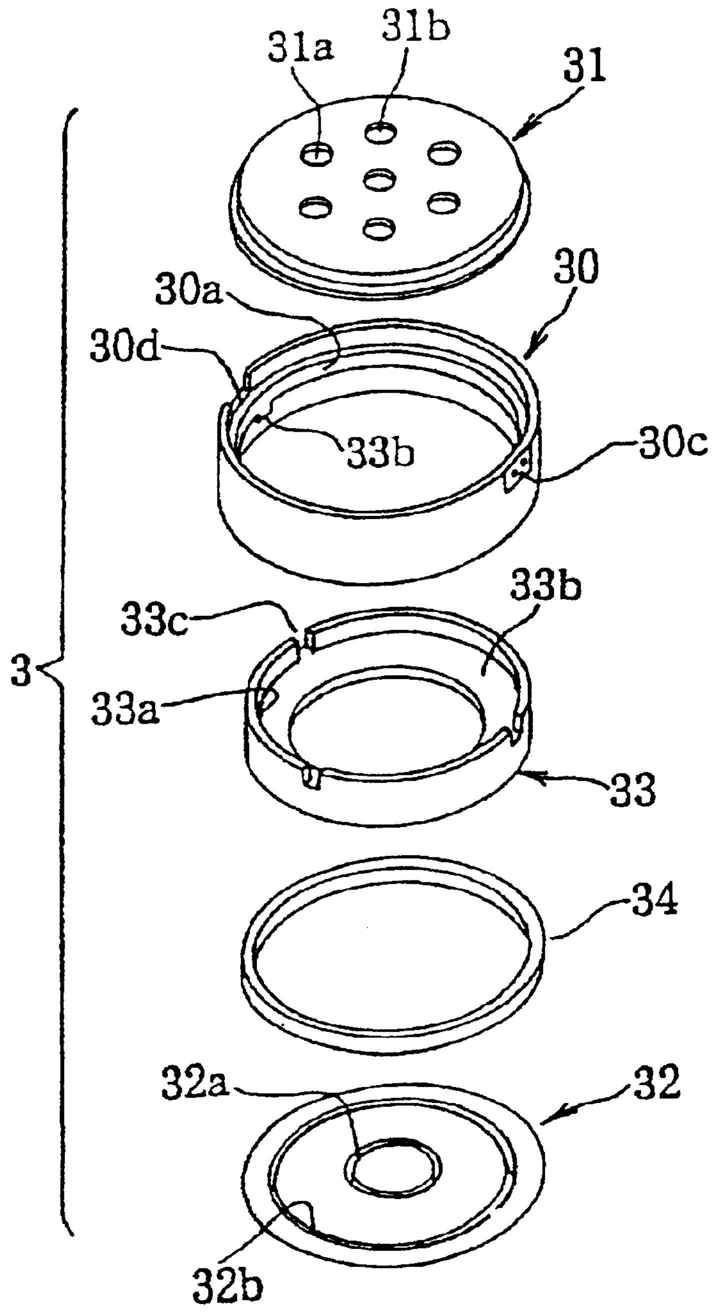
FIG. 4 is an exploded oblique drawing of the basket, which is a structural part of the electromagnetic actuator of this invention.
Figure 5:
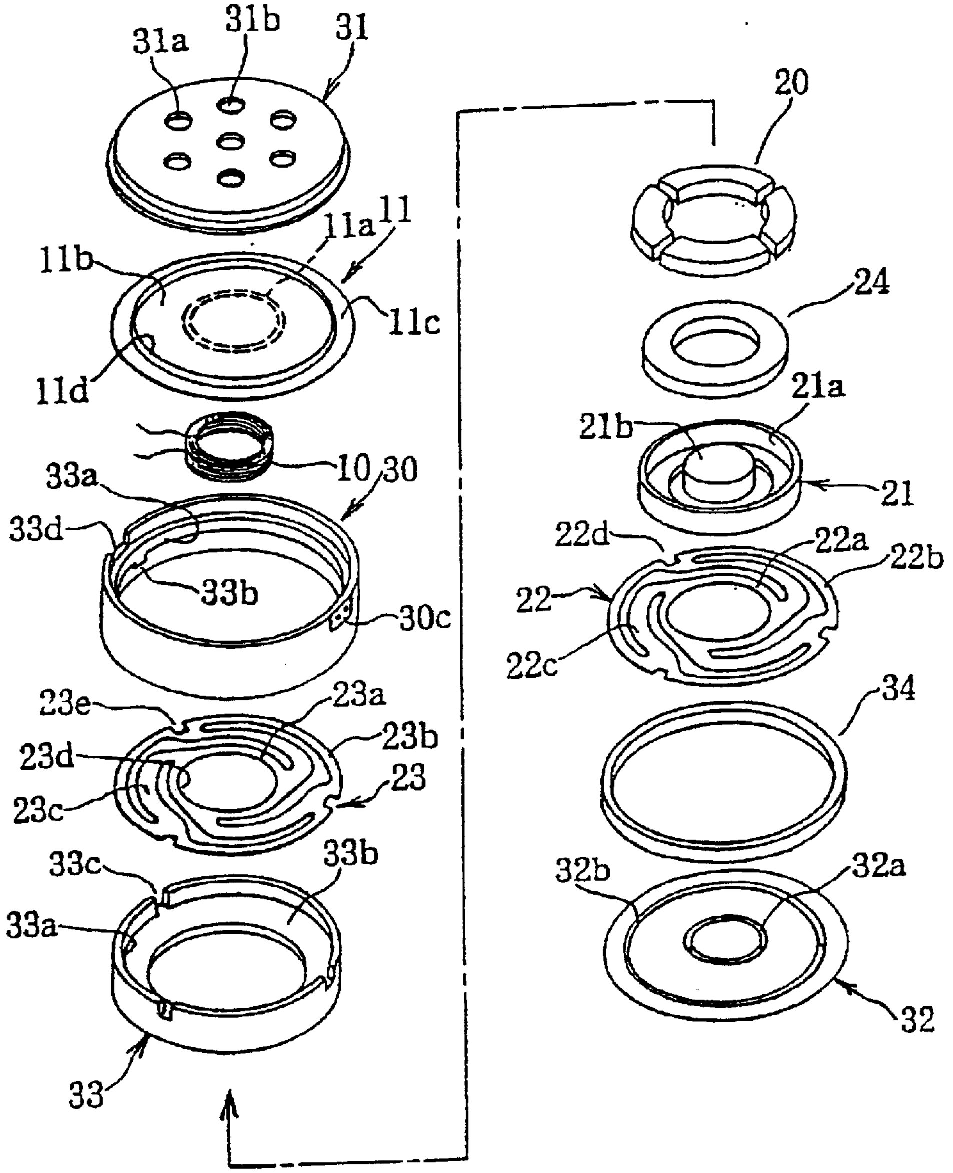
FIG. 5 is an explanatory drawing showing the order of assembly of the electromagnetic actuator of this invention.

As shown in FIG. 4, the basket 3 is formed as a low round housing that comprises a basket body 30 that accommodates the first and second vibrators 1, 2, a cover plate 31 that covers the upper side of the basket body 30, and a thin, flat bottom plate 32 that covers the bottom side of the basket body 30.

The basket body 30 is a round frame made of a polymer material such as polybutylene terephthalate (PBT). Its inner surface has steps 30*a* to receive the outer rim 11*c* of the diaphragm 11, as well as the cover plate 31. The lower side of the steps 30 projections 30*b* (only one is shown in FIG. 4) that engage the notches 22*d*, 23*e* of the vibration plates 22, 23. The basket body 30 also has air holes 30*c* in its side, and on the upper edge there is a cutout 30*d* for the flexi substrate that makes the electrical connection with the coil 10. The cover plate 31 is disk-shaped, and has a number of sound holes 31*a*, 31*b* . . . This cover plate 31 can be made of a metal with magnetic properties so as to function as a magnetic shield.

The bottom plate 32 is a part of the basket 3, and is formed of a polymer-polyethylene terephthalate (PET), polyether imide (PEI) or polyimide (PI)— so as to function as a thin vibration plate. It is best formed with a thickness not less than 50 $\mu$m and not greater than 100 $\mu$m.

When this bottom plate 32 is provided, it becomes a third vibrator of the electromagnetic actuator, and improves the frequency characteristics, including those of the first vibrator 1 and the second vibrator 2. Moreover, it is good to have at least one concentric lip 32*a* and or 32*b* on its surface; the lips 32*a*, 32*b* can improve efficiently the frequency characteristics of the bottom plate 32.

Within the basket 3 there is an elastic piece 33 formed of a rubber-based elastomer. This elastic piece 33 comprises a cylindrical outer wall 33*a* that fits against the inside of the basket body 30, and a protrusion 33*b* that projects inward from the outer wall 33*a.* The protrusion 33*b* of the elastic piece 33 can be continuous around the inner circumference, or it can be divided into three or four sections. In the upper edge of the elastic piece 33 there are notches 33*c* that fit the projections 30*b* of the basket body 30.

Aside from this elastic piece 33, the basket 3 has a spacer ring 34 to assure vibration space between the vibration plate 22 of the second vibrator 2 and the bottom plate 32 of the basket 3.

Of the parts of the basket 3, as shown in FIG. 1, the outer rim 22*b* of the vibration plate 22 is sandwiched between the elastic piece 33 and the spacer ring 34. In this way, the second vibrator 2 is supported, and the upper surface of the outer rim 23*b* of the vibration plate 23 is held down against the step 30*b* of the basket body 30.

By providing this elastic piece 33 within the basket 3, it is possible to buffer the impact force, in the event that the user drops the portable electronic equipment in which the electromagnetic actuator is mounted, by directing it from the second vibrator 2 into the elastic piece 33. Moreover, because the protrusion 33*b* is in contact with the outer edge of the magnet yoke 11, if the second vibrator 2 is shaken sideways on impact, the protrusion 33*b* acts as a stopper against the outer edge of the magnet yoke 11, thus preventing distortion of the vibration plates 23, 23. Therefore, it is possible to provide great impact resistance such that the electromagnetic actuator is not broken.

To assemble the actuator from the various parts described above, the basket body 30 is taken as the base and the diaphragm 11 with the coil 10 attached, and then the cover plate 31 are fit in to the steps 30*a* through the top of the basket body 30. The terminals of the coil 10 are kept long enough to allow the vibration of the diaphragm 11, and are connected electrically to the flexi substrate 4 that projects outward from the outer rim of the diaphragm 11.

From the under side of the basket body 30, on the other hand, the upper vibration plate 23 of the second vibrator 2 is inserted with the projections 30*b* of the basket body 30 aligned with the notches 23*e*. In the same way, the elastic piece 33 is inserted into the basket body 30 with the projections 30*b* of the basket body 30 aligned with the notches 30*d*, and assembled so that the outer rim 23*b* of the upper vibration plate 2 of the second vibrator 2 is supported. Next, the magnet yoke 21 that supports the spacer 24 and the magnet 20 is attached to the surface of the lower vibration plate 22, and the lower vibration plate 22 is inserted into the basket body 30. A spacer ring 34 that presses the outer rim 22*b* of the lower vibration plate 22 against the elastic piece 33 is inserted, and then the bottom plate 32 is fit into the lower opening of the basket body 30.

In the assembled actuator, the first vibrator 1 and the second vibrator 2 are facing as shown in FIG. 1, and the coil 10, suspended through the central opening 23*d* of the upper vibration plate 23, is in position to be attracted and repulsed upward and downward within the magnetic gap G between the inner circumference of the magnet 20 and the pole piece 21*b* of the magnet yoke 21.

In this electromagnetic actuator, when the designated frequency is impressed on the coil 10, the electromagnetic action between the magnetic field of the magnet 20 and the current impressed on the coil 10 causes a vibration to be generated by the vibration plates 22, 23 at a low frequency, or a resonant tone to be generated by the vibration of the diaphragm at a high frequency. And because it is possible to control the amount of vibration and the frequency, the amount of vibration can be adjusted to the individual preference.

When this electromagnetic actuator is mounted in portable electronic equipment, the electromagnetic actuator is normally fixed in place within the equipment case by positioning it so as to cover the sound holes in the equipment case, with a ring of elastic packing sandwiched between the equipment case and the basket of the electromagnetic actuator.

Figure 6:
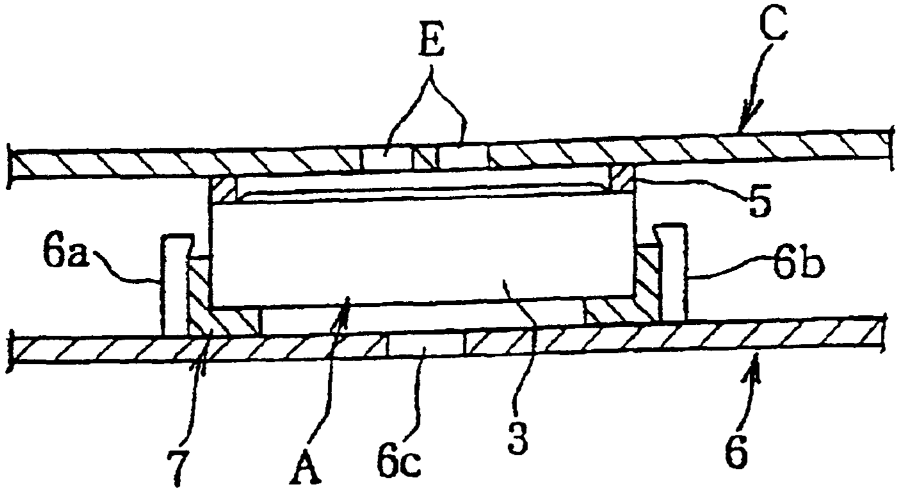
FIG. 6 is an explanatory drawing showing a partial cross section of the equipment case and mounting substrate as the mounting structure of the electromagnetic actuator of this invention.

The structure for attachment of the electromagnetic actuator of this invention is, as shown in FIG. 6, to position it over the sound holes E so that a ring-shaped elastic packing 5 is sandwiched between the inside surface of the equipment case C and the basket 3 of the electromagnetic actuator A. At the same time, the elastic packing 7 is held between the basket 3 of the electromagnetic actuator A and the surface of the mounting substrate 6 that accommodates the electromagnetic actuator A within the equipment case C.

Figure 7:
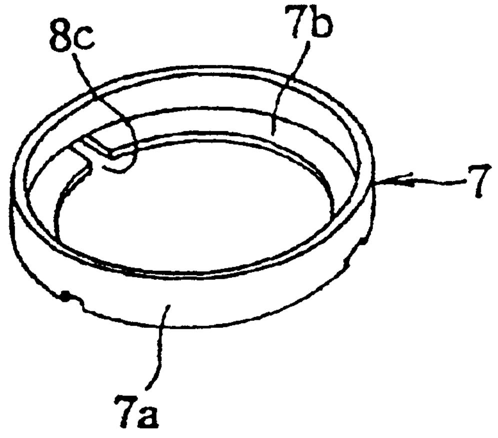
FIG. 7 is an oblique drawing showing the elastic packing used in the mounting structure of the electromagnetic actuator of FIG. 6.

These elastic packings 5, 7 can be made of a polymer material such as urethane foam. Of these, the elastic packing 7 that is placed against the surface of the mounting substrate 6 comprises a cylindrical outer wall 7*a* and an elastic base 7*b* that extends inward from the outer wall 7*a*, as shown in FIG. 7.

This elastic packing 7 is prepared as a part of the electromagnetic actuator A by fitting the outer wall 7*a* to the lower circumference of the basket body 30 as shown in FIG. 6, with the elastic base 7*b* against the surface of the mounting substrate 6 and sported by multiple stops 6*a*, 6*b* located on the mounting substrate 6. In this way, the elastic base 7*b* is in place between the surface of the mounting substrate 6 and the basket 3 of the electromagnetic actuator A, and the electromagnetic actuator A is accommodated within the equipment case C.

Now, at the bottom of the electromagnetic actuator A there is, as shown in FIG. 6, an opening 6*c* in the mounting substrate 6. And as shown in FIG. 7, there can be notches 7*c* in the elastic base 7*b* that go through the outer wall 7*a* to provide air passages.

Figure 8:
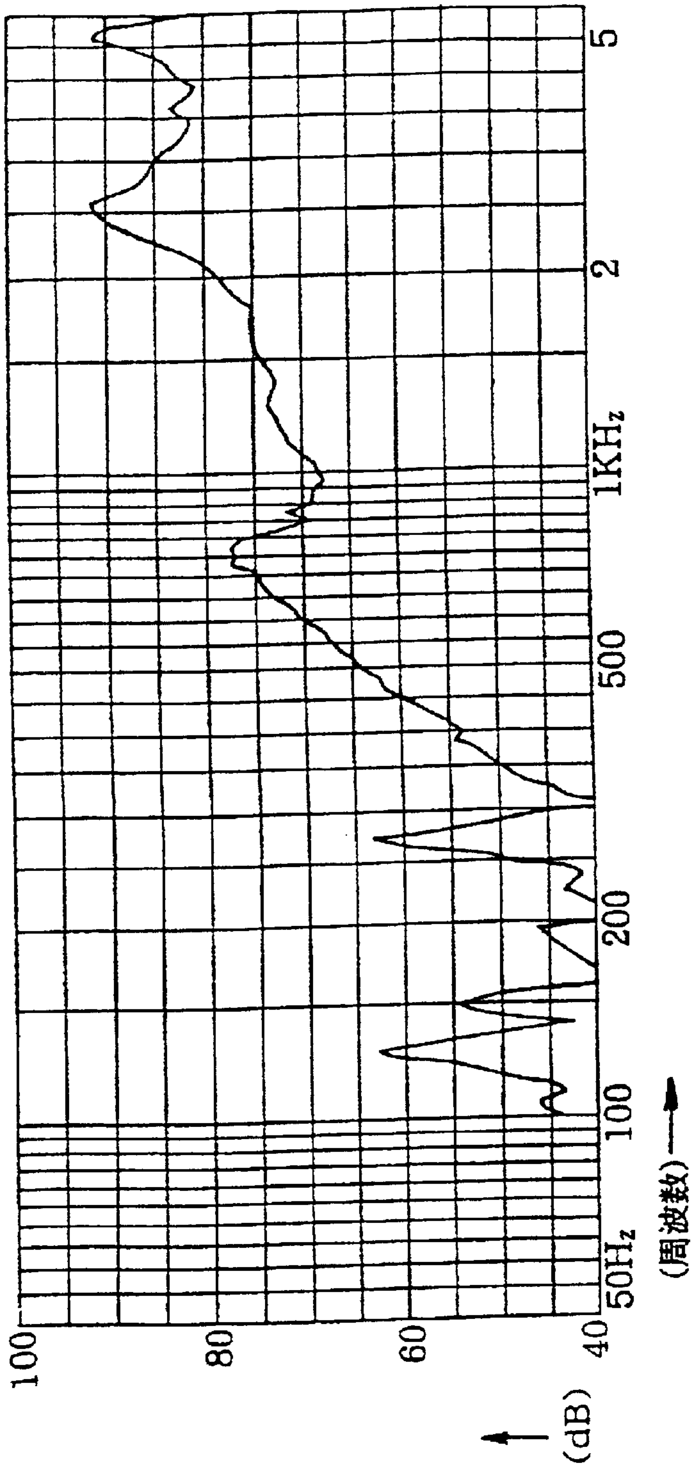
FIG. 8 is a graph showing the frequency characteristics of the mounting structure of the electromagnetic actuator without the elastic packing of FIG. 7.
Figure 9:
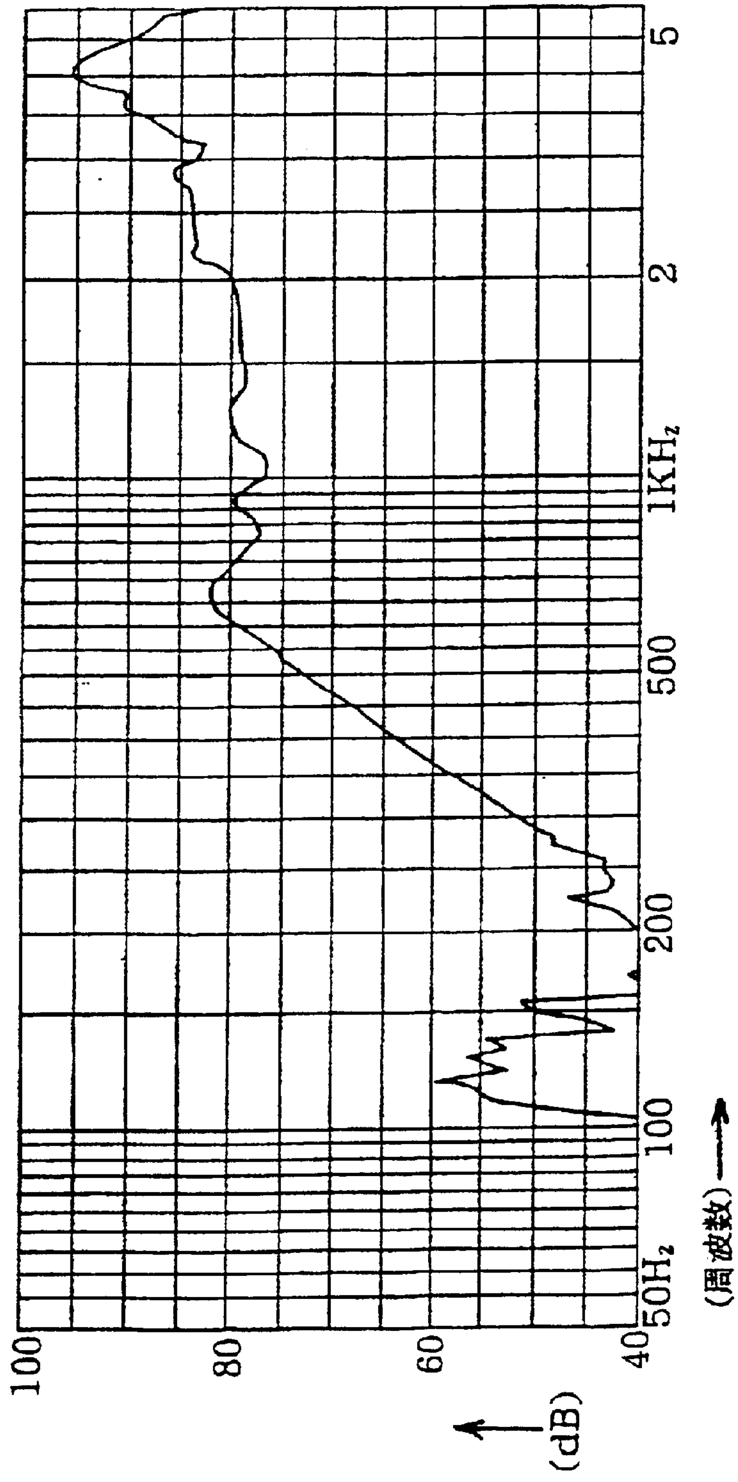
FIG. 9 is a graph showing the frequency characteristics of the mounting structure of the electromagnetic actuator with the elastic packing of FIG. 7.

Regarding the effect of this structure for mounting the electromagnetic actuator, compared with the frequency shown in FIG. 8 for the electromagnetic actuator mount without elastic backing, FIG. 9 shows that better stability is available in frequency characteristics in the range from 800 Hz to 3 Khz, and so this structure is capable of improving frequency characteristics even though it is a small and simple structure.

The words and expressions used above in the particulars of this invention were chosen simply for the purpose of explanation, and do not limit the content of the invention in any way. In the event that limiting words or expressions have been used, that is not intended to exclude equivalent modes of this invention or parts thereof. It is clear, therefore, that it is possible to make various changes to the scope of this invention for which rights are claimed.

What is claimed is:

1. A portable electronic device comprising a case and an electromagnetic actuator having a coil on which current is impressed, a magnet that forms a magnetic circuit between its poles across a magnetic gap with a magnet yoke, a diaphragm that vibrates by magnetic action when a high-frequency current is impressed and a vibration plate that vibrates by magnetic action when a low-frequency current is impressed, with the coil positioned within the magnetic gap and the coil, the magnet, the magnet yoke, the diaphragm, and the vibration plate are accommodated in a basket, the magnet is held in the magnet yoke and the magnet yoke holding the magnet is supported by the surface of the vibration plate, and the magnet, the magnet yoke and the vibration plate are assembled as a single unit, said electromagnetic actuator being mounted inside said case using a mounting structure comprising a first elastic packing sandwiched between an inner surface of said case and said basket of said electromagnetic actuator, and a second elastic packing held between said basket of said electromagnetic actuator and a substrate for mounting the electromagnetic actuator, so that the electromagnetic actuator and said substrate are mounted inside the portable electronic device.

2. A portable electronic device as described in claim 1 above, in which said second elastic packing that is held between said basket of the electromagnetic actuator and the substrate for mounting the electromagnetic actuator, comprises an outer wall and an elastic base, wherein the outer wall is fitted to a lower circumference of said basket, and said elastic base is between said substrate and said basket.

3. A portable electronic device as described in claim 2 wherein said second elastic packing further comprises a notch.

4. A portable electronic device as described in claim 2 wherein said substrate further comprises an opening.

5. A portable electronic device as described in claim 2 wherein said second elastic packing further comprises a notch, and wherein said substrate further comprises an opening.

6. A portable electronic device comprising:

a case; and an electromagnetic actuator mounted to said case by a mounting structure;

wherein said electromagnetic actuator comprises a diaphragm that vibrates by magnetic action when a high-frequency current is impressed and a vibration plate that vibrates by magnetic action when a low-frequency current is impressed; and wherein said mounting structure comprises a first elastic packing sandwiched between an inner surface of said case and said electromagnetic actuator, and a second elastic packing held between said electromagnetic actuator and a substrate for mounting the electromagnetic actuator, so that the electromagnetic actuator and said substrate are mounted inside the portable electronic device.

7. A portable electronic device as described in claim 6 wherein said second elastic packing comprises an outer wall and an elastic base, said outer wall being fitted to a lower circumference of said actuator, and said elastic base being between said substrate and said actuator.

8. A portable electronic device as described in claim 7 wherein said second elastic packing further comprises a notch.

9. A portable electronic device as described in claim 7 wherein said substrate further comprises an opening.

10. A portable electronic device as described in claim 7 wherein said second elastic packing further comprises a notch, and wherein said substrate further comprises an opening.

11. A portable electronic device comprising a case, a sound hole in said case, and an electromagnetic actuator having a coil on which current is impressed, a magnet that forms a magnetic circuit between its poles across a magnetic gap with a magnet yoke, a diaphragm that vibrates by magnetic action when a high-frequency current is impressed and a vibration plate that vibrates by magnetic action when a low-frequency current is impressed, with the coil positioned within the magnetic gap and the coil, the magnet, the magnet yoke, the diaphragm, and the vibration plate are accommodated in a basket, the magnet is held in the magnet yoke and the magnet yoke holding the magnet is supported by the surface of the vibration plate, and the magnet, the magnet yoke and the vibration plate are assembled as a single unit, said electromagnetic actuator being mounted inside said case using a mounting structure comprising a first elastic packing sandwiched between an inner surface of said case and said basket of said electromagnetic actuator so that said first elastic packing encloses said sound hole in said case, and a second elastic packing held between said basket of said electromagnetic actuator and a substrate for mounting the electromagnetic actuator, so that the electromagnetic actuator and said substrate are mounted inside the portable electronic device.

12. A portable electronic device as described in claim 11 wherein said second elastic packing further comprises a notch.

13. A portable electronic device as described in claim 11 wherein said substrate further comprises an opening.

14. A portable electronic device as described in claim 11 wherein said second elastic packing further comprises a notch, and wherein said substrate further comprises an opening.

15. A portable electronic device comprising:

a case;

a sound hole in said case; and an electromagnetic actuator mounted to said case by a mounting structure;

wherein said electromagnetic actuator comprises a diaphragm that vibrates by magnetic action when a high-frequency current is impressed and a vibration plate that vibrates by magnetic action when a low-frequency current is impressed; and wherein said mounting structure comprises a first elastic packing sandwiched between an inner surface of said case and said electromagnetic actuator so that said first elastic packing encloses said sound hole in said case, and a second elastic packing held between said electromagnetic actuator and a substrate for mounting the electromagnetic actuator, so that the electromagnetic actuator and said substrate are mounted inside the portable electronic device.

16. A portable electronic device as described in claim 15 wherein said second elastic packing comprises an outer wall and an elastic base, said outer wall being fitted to a lower circumference of said actuator, and said elastic base being between said substrate and said actuator.

17. A portable electronic device as described in claim 15 wherein said second elastic packing further comprises a notch.

18. A portable electronic device as described in claim 15 wherein said substrate further comprises an opening.

19. A portable electronic device as described in claim 15 wherein said second elastic packing further comprises a notch, and wherein said substrate further comprises an opening.

* * * * *